O. MALCHER.
CALCULATING MACHINE.
APPLICATION FILED JAN. 7, 1915.

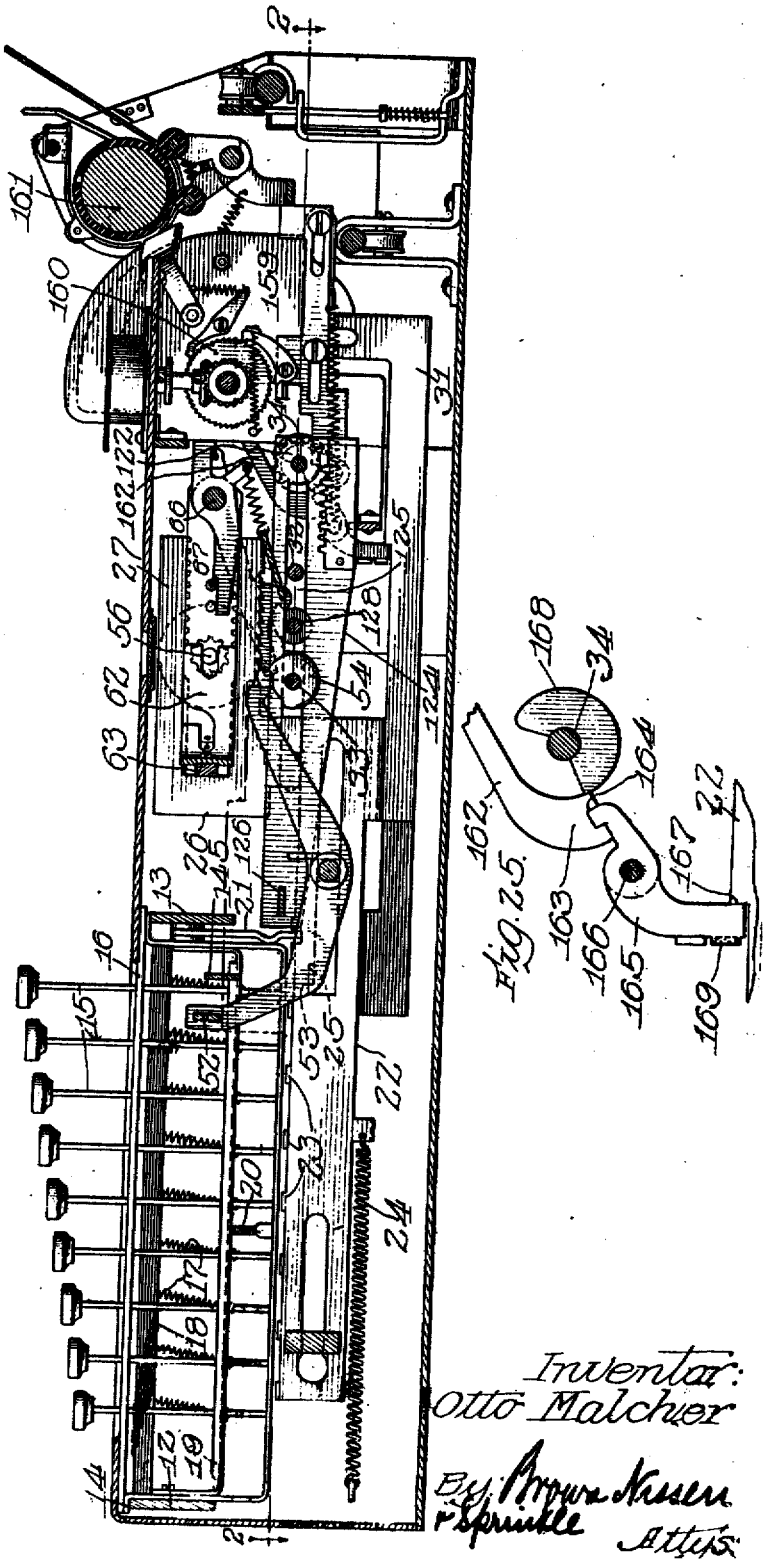

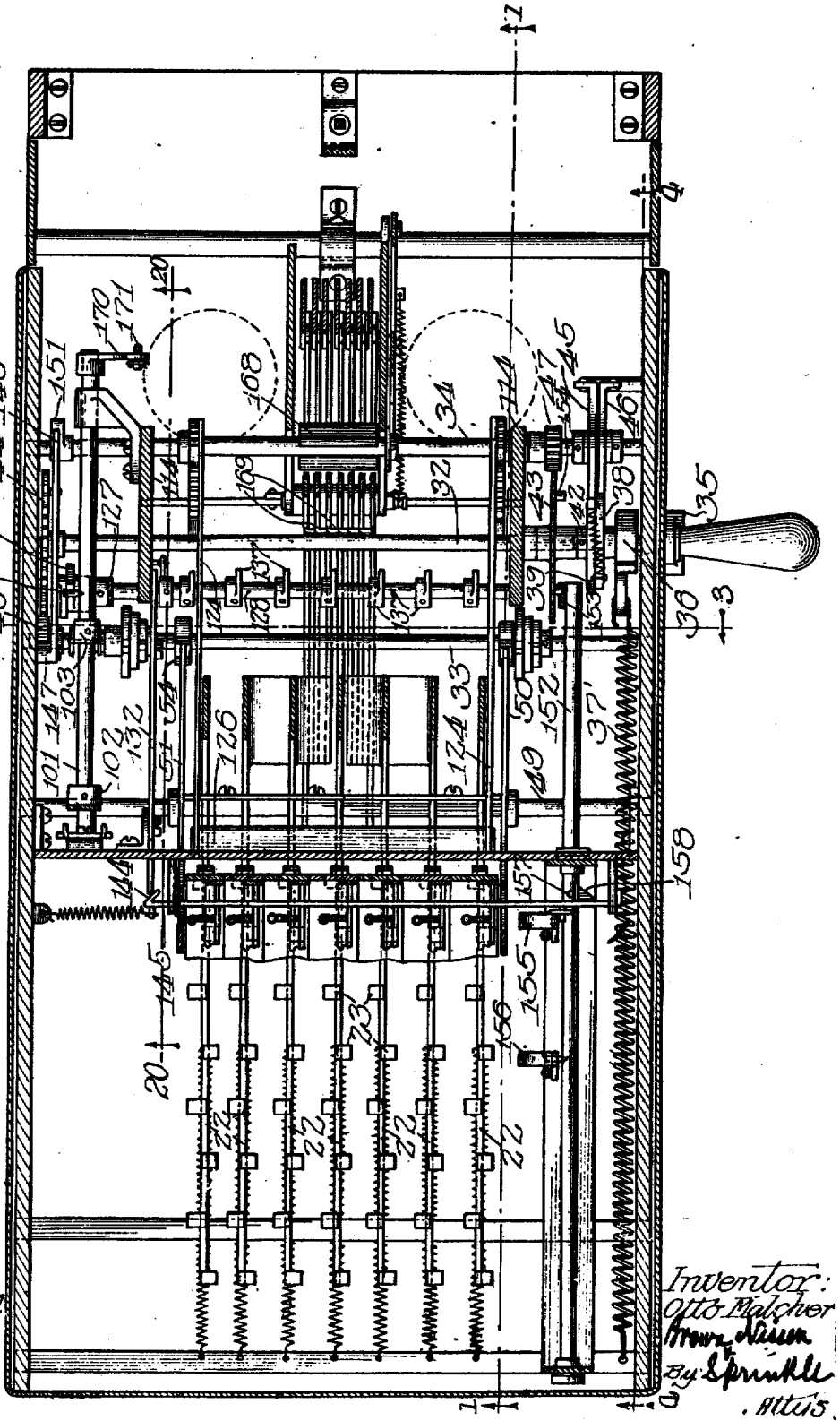

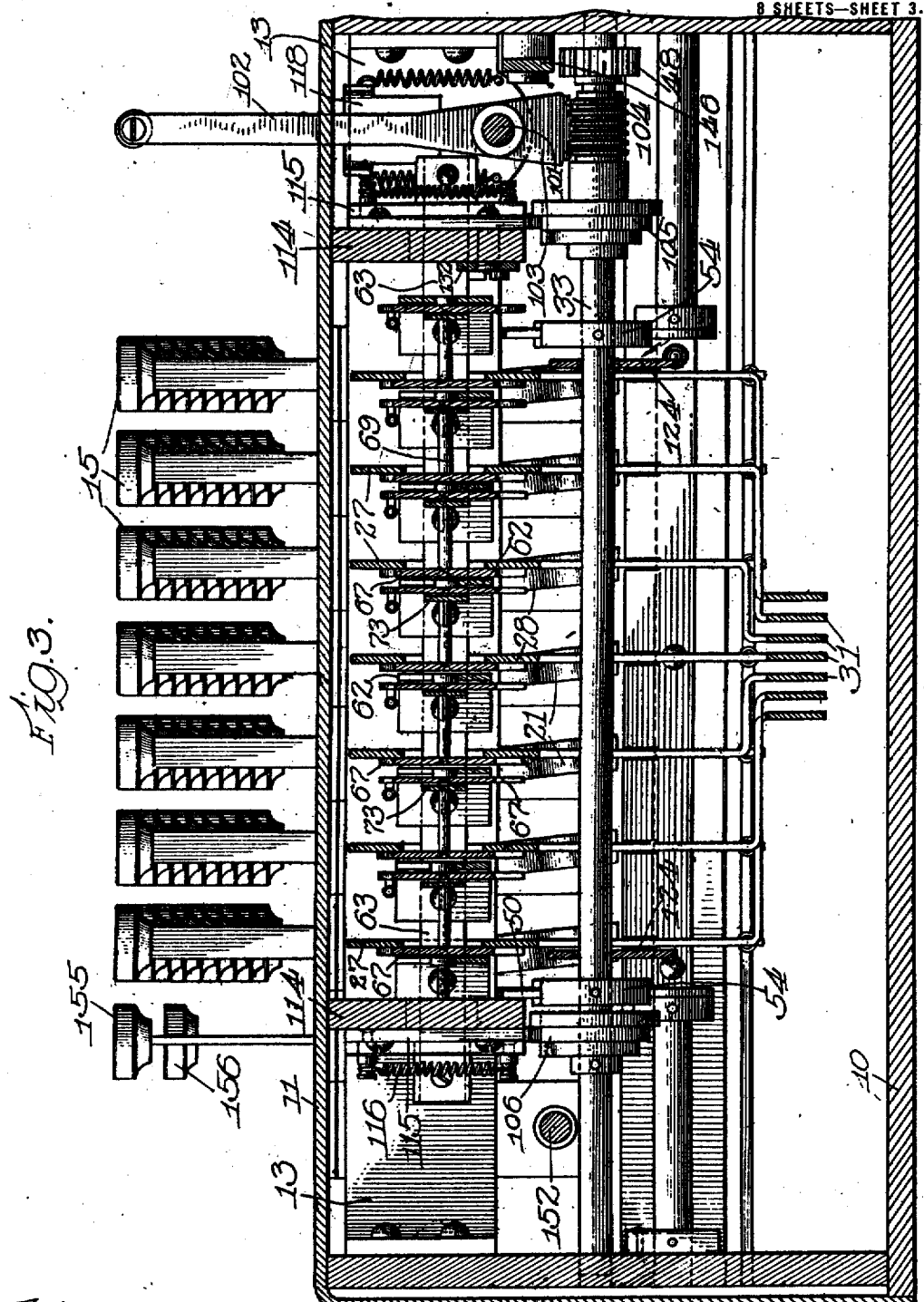

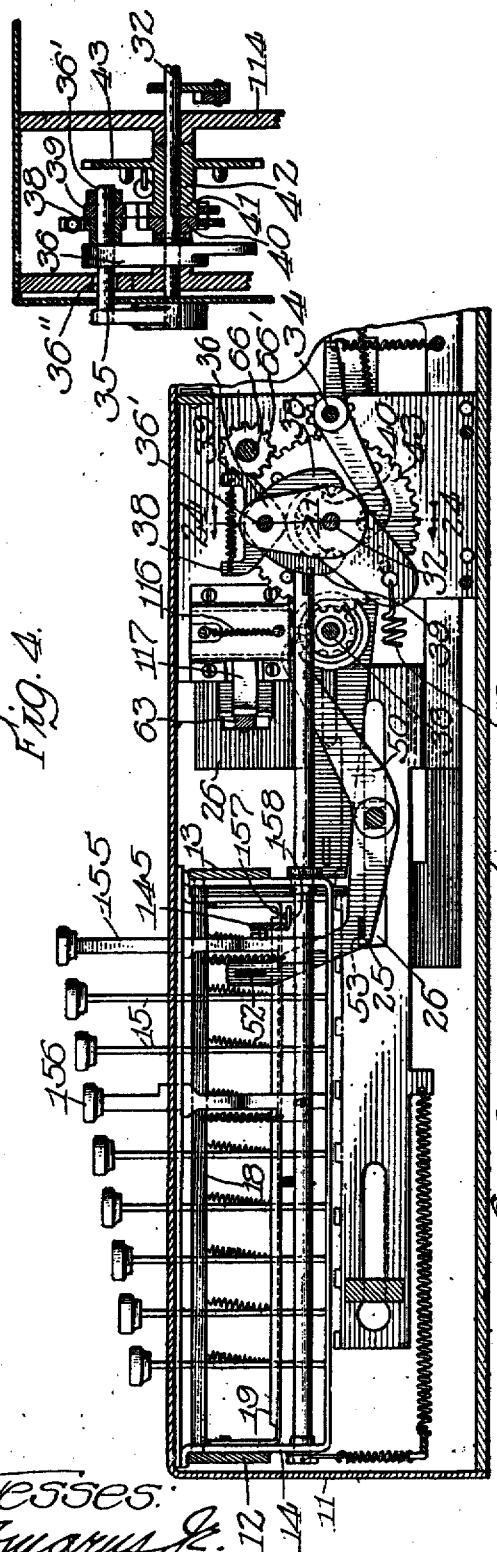

1,318,397.

Patented Oct. 14, 1919.
8 SHEETS—SHEET 5.

Witnesses:
G. W. Domarus Jr.
R. Bauerle

Inventor:
Otto Malcher
By Brown Nissen & Sprinkle
Attys.

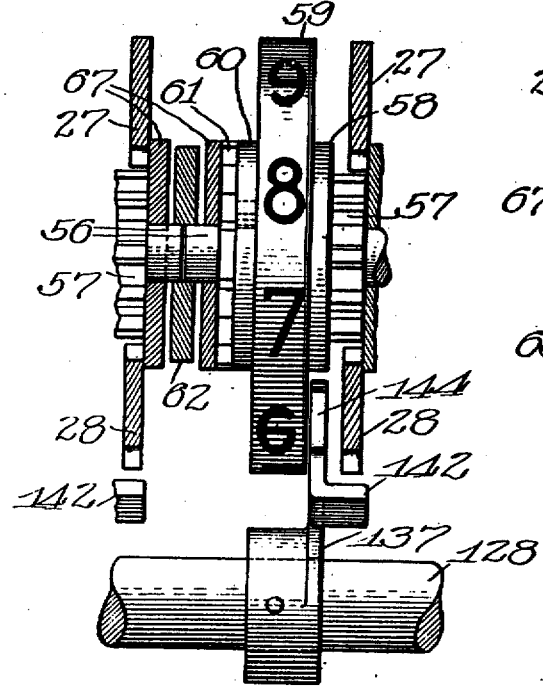
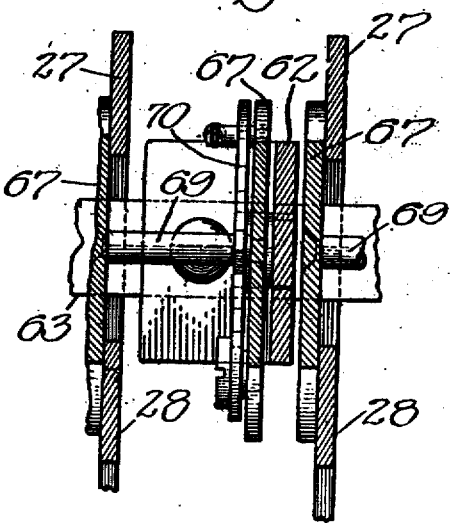
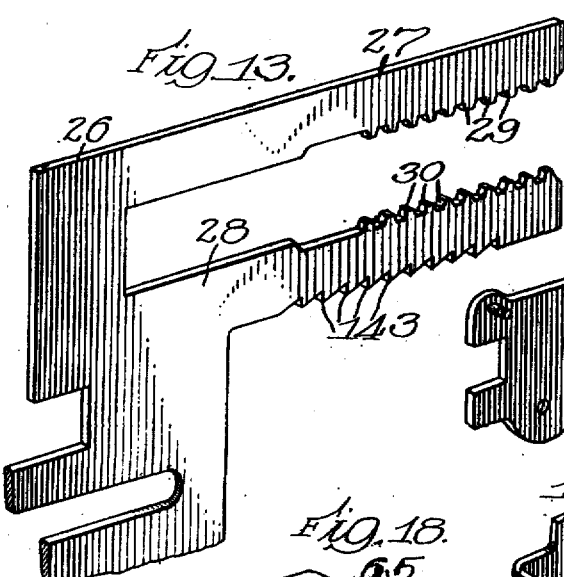
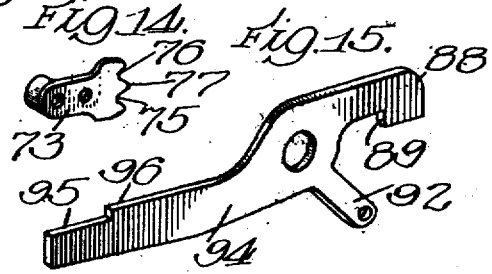
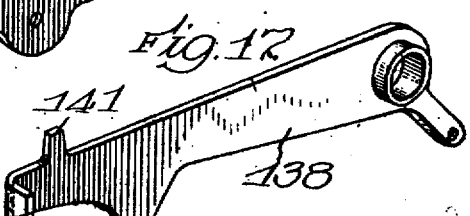
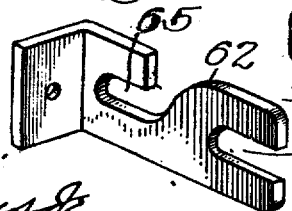

O. MALCHER.
CALCULATING MACHINE.
APPLICATION FILED JAN. 7, 1915.
1,318,397.
Patented Oct. 14, 1919.
8 SHEETS—SHEET 7.
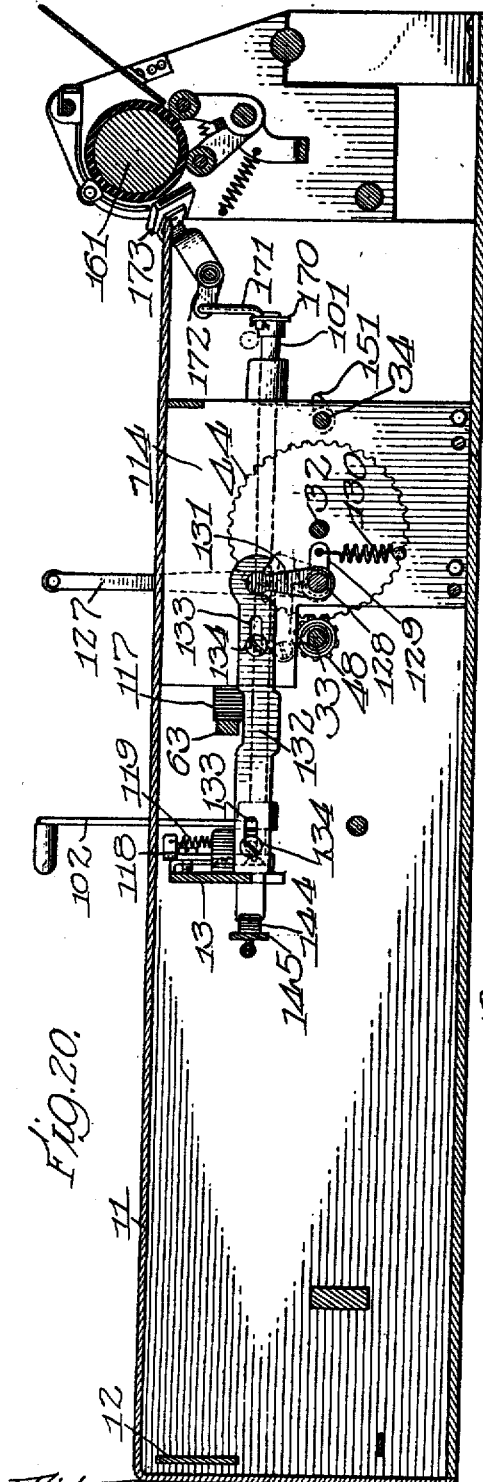
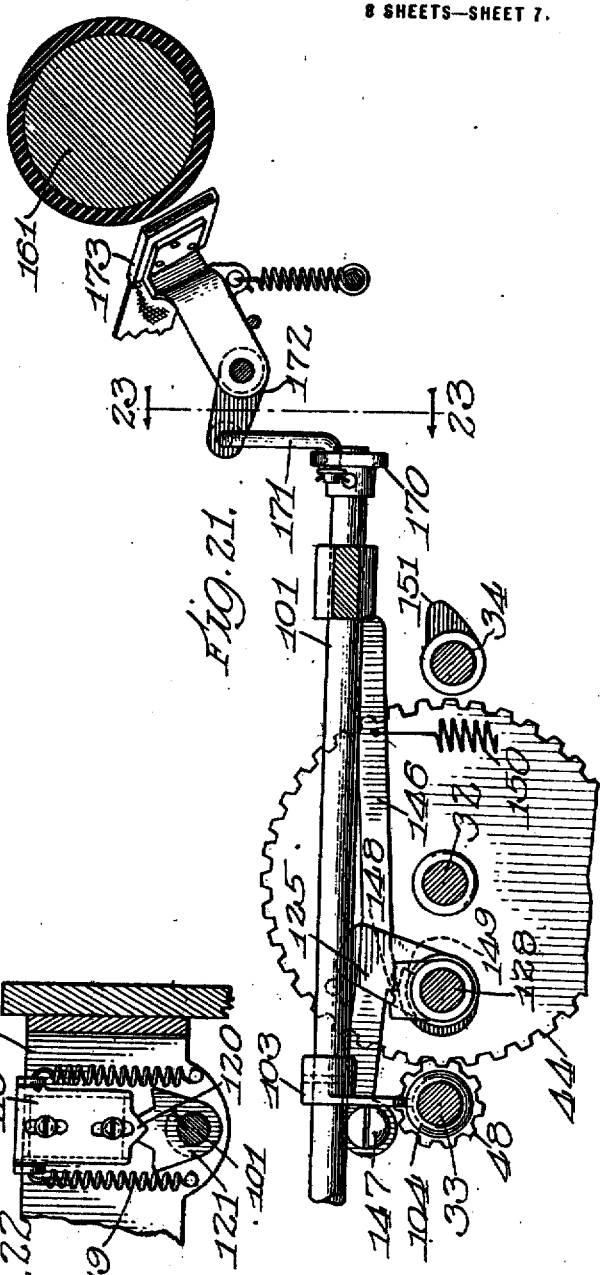
Witnesses:
Inventor:
Otto Malcher
By Attys O. MALCHER.
CALCULATING MACHINE.
APPLICATION FILED JAN. 7, 1915.
1,318,397.
Patented Oct. 14, 1919.
6 SHEETS—SHEET 8.
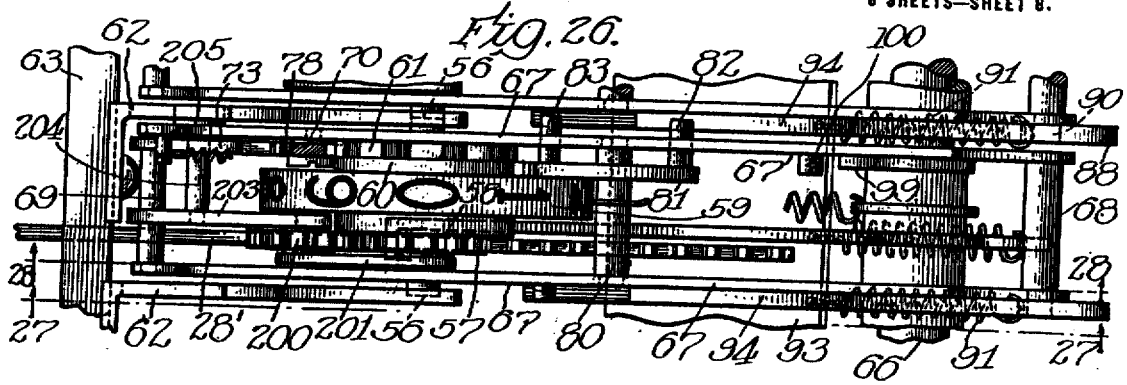
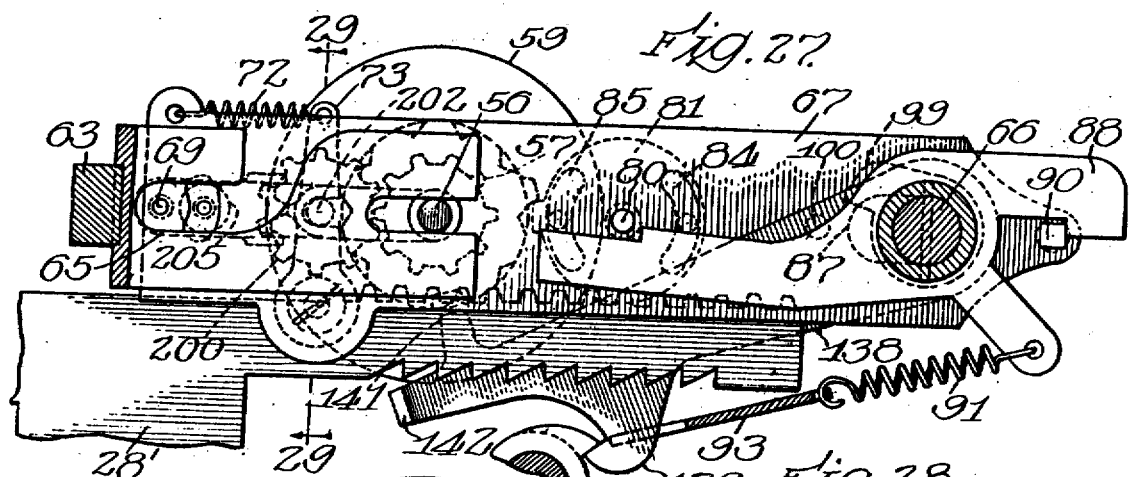
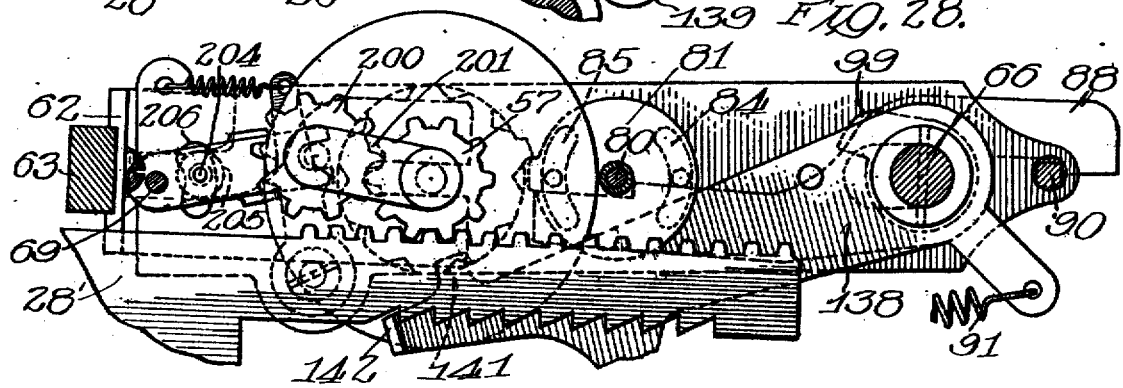
Witnesses:
Inventor:
Otto Malcher
By Brown Nissen Hanna
Attys.

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

CALCULATING-MACHINE.

1,318,397.

Specification of Letters Patent.   Patented Oct. 14, 1919.

Application filed January 7, 1915. Serial No. 868.

*To all whom it may concern:*

Be it known that I, OTTO MALCHER, a citizen of the United States, residing at Chicago, in the county of Cook and State of Illinois, have invented certain new and useful Improvements in Calculating-Machines, of which the following is a specification.

This invention consists substantially in the combination and arrangement hereinafter described and illustrated in the accompanying drawings, and more particularly set forth in the appended claims.

In the drawings:

Figure 1 is a longitudinal section of my invention taken on line 1—1 of Fig. 2.

Fig. 2 is a sectional plan view of my invention taken on line 2—2 of Fig. 1.

Fig. 3 is a transverse sectional view on line 3—3 of Fig. 2.

Fig. 4 is a fragmentary longitudinal section on line 4—4 of Fig. 2.

Fig. 5 is an elevational view of a part of a mechanism for setting the machine in adding, subtracting and non-calculating positions.

Fig. 6 is a sectional elevation on line 6—6 of Fig. 5.

Fig. 7 is a sectional plan view on line 7—7 of Fig. 5.

Fig. 11 is a fragmentary view on line 11—11 of Fig. 8, some of the parts being shown in elevation.

Fig. 12 is a fragmentary sectional elevation on line 12—12 of Fig. 8.

Figure 8:
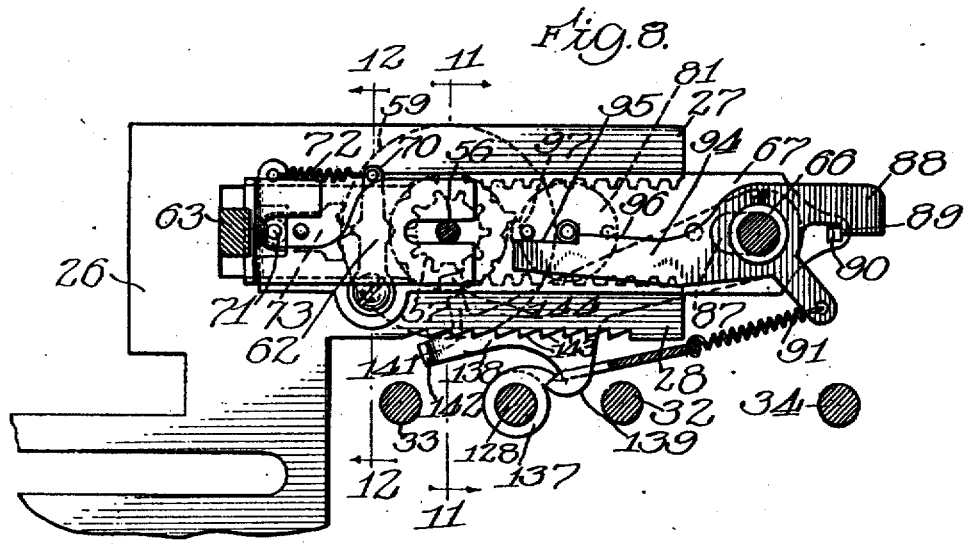
Fig. 8 is a fragmentary sectional elevation showing the totalizer and automatic clearing devices.

Figs. 13 to 19, inclusive, are detail perspectives of some of the parts of the invention.

Fig. 20 is a longitudinal section on line 20—20 of Fig. 2.

Fig. 21 is an enlarged fragmentary sectional view showing the lock for the automatic clearing shaft and the ribbon shift.

Fig. 22 is an elevational view of the lock for the setting mechanism.

Fig. 23 is a section on line 23—23 of Fig. 21.

Fig. 24 is a fragmentary section on line 24—24 of Fig. 4.

Fig. 25 is an enlarged detail of the locking mechanism for the printing hammers.

Fig. 26 is a plan view of a modified form of totalizer for use with this invention.

Fig. 27 is a section on line 27—27 of Fig. 26.

Fig. 28 is a section on line 28—28 of Fig. 26, showing the totalizer in subtracting position.

Fig. 29 is a section on line 29—29 of Fig. 25.

The calculating machine constituting the present invention comprises a flexible keyboard, a reversible totalizer, a plurality of racks for operating said totalizer, a main drive shaft, two secondary drive shafts, printing mechanism, automatic clearing mechanism, and various accessories and operating parts. In calculating operations, the numbers are set up on the key-board and transferred to the totalizer. The totalizer is operated by the reciprocating racks, the extent of movement of the racks being limited by the particular keys depressed, and the extent of movement of the totalizer depends upon the movement of the racks. The racks also set up in the printing mechanism the same number which is set up on the keyboard, and transferred to the totalizer. The various numbers to be added or subtracted are set up on the key-board, transferred by the reciprocating racks to the totalizer, and printed by the printing mechanism, and after a complete calculation, the totalizer is automatically cleared of the number resulting from the calculation by shifting the automatic clearing key and reciprocating the main operating handle.

Key-board.

The key-board of the present invention is a flexible or self-correcting key-board, that is, if it is desired, after an insertion has been made by depressing a key, to make another insertion by depressing another key in the same decimal order, the originally depressed key is automatically released upon the operation of the second key. The key-board is constructed in units, the keys of each decimal order constituting a unit of said keyboard, which is bodily independent of the remaining units of the key-board. The machine comprises a base-plate 10, and a casing 11. Transverse bars 12 and 13 extend across the casing, and supported by the bars 12 and 13 are U-shaped frames 14 for supporting the keys 15 of each set or decimal order. Extending across the top of each of the U-shaped members 14 is a bar 16 having openings therein, through which the keys are mounted to slide, the lower ends of the keys being fitted in openings in the bottom portion of the bar 14. The keys are normally held in their upper position by means of springs 17, there being a spring attached to each key, and the upper end of these springs being attached to a bar 18 extending the full length of the U-shaped member 14, as shown in Figs. 1 and 4. A pivoted locking bar 19 is carried by each U-shaped member 14, as shown in Fig. 1, and is adapted to be swung inwardly to engage notches in the edges of the keys 15 by a spring 20. When a key is pressed downwardly, it is held in its lowered position by the locking bar 19, which enters a notch in the key. If, while a key is held in this lower position, another key in the same decimal order is depressed, the bar 19 is swung outwardly by the second key, to release the first, in a manner well known in the art. When a key is depressed, its lower end protrudes through the bottom portion of the bar 14 into a position to intercept the forward movement of the reciprocating rack for the particular decimal order in which the key is depressed. The point at which the forward movement of the rack is arrested depends upon which of the keys of the particular unit is depressed. Each decimal unit is provided with one key for each of the nine digits, and if the key representing a particular digit, three, for instance, is depressed, the rack will move just far enough to rotate its totalizer wheel three digits, as will be later explained. Secured to the pivot which carries the inner end of the locking bar 19, as shown in Fig. 1, is a lock 21, which, prior to the depression of any key, lies in the path of movement of a lug on the corresponding reciprocating rack to prevent any movement of the rack prior to the depression of one of the keys, as will be later explained. As the construction of the keyboard forms no part of the present invention, but is described and claimed in my copending application, Serial Number 825,782, further description is thought to be unnecessary.

Racks.

A reciprocating rack 22 is provided with each decimal order, as shown in Figs. 1 and 2. These racks carry a series of lateral projecting lugs 23 adapted to contact with the depressed end of the keys 15 to arrest the forward movement of the rack. The racks are normally drawn forwardly by springs 24, and are held in their rearward position by locks 21 and by the locking-bar 25, as will be more fully explained. Each rack 22 is off-set upwardly, as shown in Figs. 1 and 8, to provide a bifurcated upper end 26 (see Figs. 1, 8 and 13). The bifurcations 27 and 28 of the rack 22 carry gear teeth 29 and 30 respectively. These gear teeth are adapted to be brought into operative relation with a pinion for operating the totalizer, as will be explained. Projecting laterally from the lower portion of each rack is an extension 31 shown in Fig. 1, for operating the printing mechanism. The extensions 31 are off-set inwardly, as shown in Fig. 2, for purpose of compactness of the printing mechanism.

Drive shafts.

Mounted in the side members of the machine and extending transversely thereof, are three drive-shafts, 32, 33 and 34, as shown in Figs. 1, 2 and 4. Loosely mounted on the shaft 32 outside of the casing, as shown in Figs. 2 and 24, is a hand-crank 35, and loosely mounted on the same shaft 32, but within the casing, is a bell-crank 36, shown in Figs. 2 and 4 and 24. A pin 36′ extends through a slot 36″ in the casing, and connects the crank 35 with the bell-crank 36 to rotate therewith, the slot in the casing limiting the movement of the crank to a quarter turn. A spring 37, shown in Figs. 2 and 4, is connected to the lower arm of the bell-crank 36, and holds the bell-crank 36 and the hand-crank 35 in the position shown in these figures. Fastened to the pin 36′ to rotate with the bell-crank 36, are two pawls 38 and 39. The pawl 38 contacts with a ratchet member 40 secured to the shaft 32 to rotate said ratchet member when the bell-crank 36 moves to the left, as viewed in Fig. 4. A ratchet member 41 is mounted on a collar 42, which is free to turn on the shaft 32. A gear wheel 43 is loosely mounted on the shaft 32, but is connected with the collar 42 to turn therewith. A gear wheel 44 is secured to the opposite end of the shaft 32 to rotate therewith. It will thus be seen that when the hand-crank 35 is pulled forwardly or to the left in Fig. 4, it will carry the pawl 38, and rotate the shaft 32 a quarter of a turn in that direction. When the hand-crank is released, the spring 37 will return it to its upright or original position, at the same time carrying the pawl 39, together with its ratchet member and the gear 43 a quarter of a revolution to the right, as viewed in Fig. 4. Pawls 45 and 46 are adapted to prevent return motion of the cam members 40 and 41, respectively. Rigidly secured to the shaft 34 is a pinion 47, having a gear ratio of 1 to 4 to the gear 43, so that the shaft 34 is given one complete revolution at each return stroke of the crank 35. Secured to the shaft 33 is a pinion 48 in mesh with the gear 44, and having the proper ratio to the gear 44 to rotate the shaft 33 one complete revolution at each forward motion of the hand-crank 35.

*Rack lock and release.*

Pivotally mounted on a shaft 49 which extends transversely of the frame of the machine are two levers 50 and 51, shown in Figs. 1, 2 and 4. Connecting the levers 50 and 51 are bars 25 and 52, the bar 25 extending through slots in the rack-bars 22, and the bar 52 extending across the key-board in position to contact with the upper edges of the locking bars 19. The rack-bars 22 are provided with off-sets or notches 53 at the ends of the slots, and the bar 25 is adapted to contact with the shoulders formed by these notches to hold the rack-bars 22 in their rearward position against the action of the springs 24. Carried by the shaft 33 are two cam members 54, shown in Figs. 1 and 2. The levers 50 and 51 have contact points 55 adapted to contact with the cam members 54, and normally lie in a depression in said cam members when the bar 25 is in position to lock the racks 22 in the rearward position. Upon rotation of the shaft 33 with the cam members 54, the contact points 55 are pushed upwardly, thus rocking the levers 50 and 51 to bring the bar 52 into contact with the bars 19, to hold the bars 19 in the lower position, and prevent operation of the keys 15, at the same time moving the bar 25 out of the notches 53, and releasing the rack-bars 22 to move forwardly. It will thus be seen that during the forward motion of the rack-bars, the keys 15 are all locked in place. The forward motion of the racks is arrested by the particular key that has been depressed in the decimal order corresponding with each rack. If no key has been depressed in any decimal order, the lock 21 will retain the rack for that order in its retracted position and no movement of the totalizer for that order will be made. In decimal orders where keys have been depressed, however, the locks 21 will have been moved out of contact with the racks by the movement of the bars 19 caused by the depression of the keys; and in these orders the racks will move forwardly when released by the levers 50 and 51, until stopped by the particular keys depressed, to operate the totalizer units.

*Totalizer.*

The totalizer used in the present invention is what is known as a reversible totalizer, that is, it may be set either for adding or subtracting operations. For each decimal order a totalizer unit is provided, and is placed in position to be operated by the rack for the corresponding decimal order.

Figure 9:
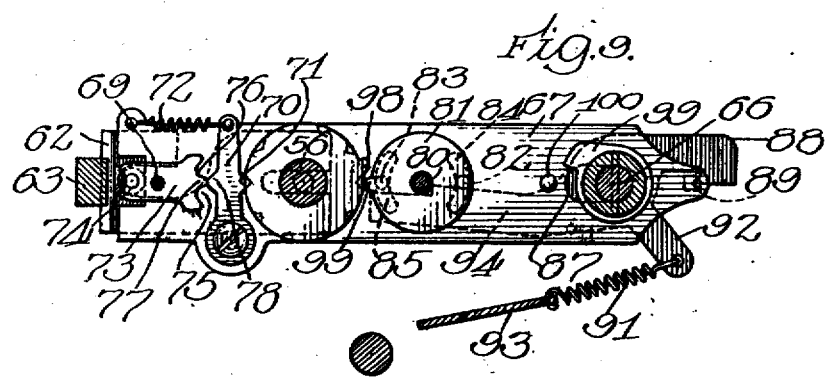
Fig. 9 is a sectional elevation on line 9—9 of Fig. 10.
Figure 10:
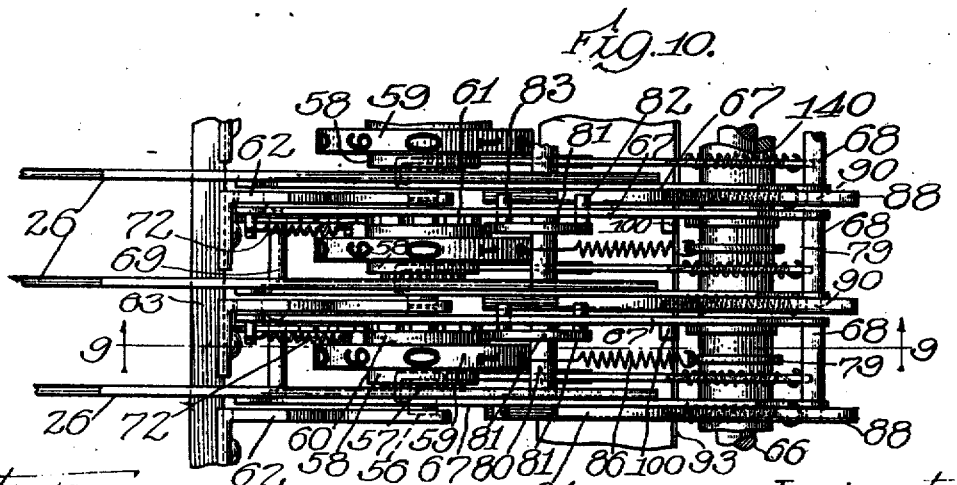
Fig. 10 is a fragmentary plan view of the totalizer mechanism and automatic clearing devices.

Each totalizer unit is mounted for free rotation on a short shaft 56, and comprises a ten-tooth pinion 57, an automatic clearing wheel 58, a number-wheel 59, a one-tooth carrying gear 60, and a star-wheel 61, as shown particularly in Fig. 11. These parts of the totalizer unit are all held rigidly together to rotate in unison. The short shafts 56 are mounted for sliding motion in the pinion members 62, shown in Figs. 1 and 18. The pinion members 62 are carried by a bar 63, which extends across the frame of the machine. (See Figs. 8 and 10). These pinion members 62 are provided with slots 64 and 65, each slot 64 carrying adjacent ends of short shafts 56 of two totalizer units, as shown in Fig. 11. The bar 63 is adapted to be slid vertically to move the pinion 57 into three different positions, by mechanism that will be later explained. In the central position, as shown in Figs. 8 and 11, the gear 57 is entirely out of contact with the bifurcated ends of the rack-bar 22. For adding operations, the bar 63 is moved upwardly until the gear 57 comes in contact with the upper bifurcation 27. In this position, when the rack-bar moves forwardly, the gear 57 is rotated to the left, in Fig. 8, and the numerals on the numeral-wheel 59 are moved in the adding direction, that is, in the direction to bring numerals of a higher value into the upper or sight position on the machine. When the bar 63 is depressed, and the rack 22 moved forwardly, the numeral wheel 59 is rotated in the opposite or subtracting direction, since the rack, in this position, is in contact with the lower instead of the upper side of the pinion 57. Extending across the machine in the same horizontal plane as the central position of the shafts 56 is a fixed shaft 66. Pivotally mounted on the shaft 66 are plates 67, which extend forwardly therefrom, and have circular openings in which the shafts 56 are carried, as shown in Figs. 9, 10 and 11. There are two bars 67 for each totalizer unit, and these bars are connected together at one end by spacers 68, and at the other by spacers 69. The plates 67 and spacers 68 and 69 form in effect a rectangular box, which controls the position of the totalizer unit longitudinally of the machine, but leaves it free to move vertically about the shaft 66, as a pivot. Pivotally mounted on one of the plates 67, as shown in Figs. 8, 9 and 10, is a locking lever, 70, having a projection 71 adapted to enter notches in the star-wheel 61, whenever the totalizer unit is in its central position. This is to prevent accidental rotation of the totalizer unit. A spring 72 normally tends to hold the lock 70 away from the star-wheel 61, and the lock 70 is pressed into contact with the star-wheel by the latch operating member 73. This member 73 is pivotally carried on the spacer 69, and has a lug 74 extending into the slot 65 in the member 62. On the end of the member 73 opposite the lug 74 are two notches 75 and 76, and a projection 77. In its central position the projection 77 engages a corresponding projection 78 on the lock 70, and holds the lock in position against the star-wheel 61. When the bar 63 is moved upwardly, it carries with it the lug 74. At the same time the spacer 69 also moves upwardly more rapidly than the lug 74, since the spacer 69 swings about the shaft 66 as a pivot, being carried by the plate 67 which acts as a radius-arm, and has a point 56 nearer the center than 69, which moves upwardly at the same rate as the lug 74. This relative movement of the points 74 and 69 moves the notch 75 upwardly into position to receive the projection 78 when the gear 57 has come into contact with the upper bifurcation 27 of the rack 22. Similarly, when the bar 63 is moved downwardly, the notch 76 comes into contact with the projection 78, and frees the star-wheel 61 from the lock 70. It will thus be seen that in both the upper and lower positions of the totalizer mechanism, that is, in its operating positions, it is free to rotate, but in its central or non-calculating position, it is positively held against accidental rotation. In the modified form of totalizer shown in Figs. 26 to 29 inclusive, a single rack 28' is used in place of the bifurcated rack previously described. In this form of totalizer a second pinion 200 is held in mesh with the pinion 57 by means of a link 201. The link 201 is pivotally mounted on the shaft 56, and carries at its opposite end a stub shaft 202 on which the pinion 200 is mounted to rotate. Pivotally mounted on the spacer member 69, which connects the side-plates 67, is a link 203. The totalizer lock operating member 73 is also pivotally mounted on the spacer 69, and the link 203 is connected to the member 73 by a pin 204 which has a lug 205, projecting from the end thereof into the slot 65 of the vertically movable side plate 62. An arcuate slot 206 is cut in the side plate 67 to permit the pin 204 to move therein. It will be seen that when the bar 63 is moved vertically, it will carry the shaft 56 therewith, as previously described, and will swing the side members 67 about the shaft 66 as a pivot. When the bar 63 is in central or non-calculating position, the spacer 69, the pin 204, the stub shaft 202, and the totalizer shaft 56, will all be in horizontal alinement, as shown in Fig. 27. When the bar 63 is moved downwardly as shown in Fig. 28, the pinion 57 will be carried by the plate 62 into contact with the rack 28. At the same time the pin 204 will move downwardly at the same rate as the shaft 56, because of its connection 205 with the plate 62. The spacer 69, however, will be moved a greater distance downwardly than the pin 204, since it is carried by the side plates 67 which are pivoted on the shaft 66. This will throw the spacer 69 lower than the pin 204, and hence will raise the end of the bar 203 opposite the spacer 69 upwardly. The bar 203 is bifurcated at 207, and these bifurcations occupy a position on opposite sides of the stub shaft 202, as shown in Fig. 28. It will therefore be seen that when the bar 63 is moved to its downward position, the pinion 57 will be thrown into contact with the rack 28' and the pinion 200 will be thrown upwardly away from said rack. It will also be apparent that an upward movement of the bar 63 will raise the pinion 57 out of contact with the rack 28', and at the same time throw the pinion 200 downwardly into contact with the rack. The direction in which the totalizer is rotated by the rack is thus reversed by shifting the bar 63 to set the totalizer in adding or subtracting position, and a neutral position in which the totalizer is out of contact with the rack is also provided. In this form of totalizer the lock for holding the totalizer when in neutral position, as well as the carrying mechanism and automatic clearing device is the same as in the form of totalizer previously described.

*Carrying mechanism.*

Each of the numeral wheels 59 has on its surface digits from 0 to 9, so that a complete revolution of the numeral wheel adds or subtracts, as the case may be, ten units of the decimal order which the particular numeral wheel represents. It will thus be seen that for each complete revolution of a numeral wheel, one unit should be added to, or subtracted from, the next higher decimal order, according to the operation, whether it is addition or subtraction. In this invention, this is accomplished by mechanism for rotating the totalizer unit in the next higher decimal order, one point, by moving the pinion 57 of that order along the operating rack a sufficient distance to produce the desired rotation. This carrying mechanism can best be understood by reference to Figs. 8, 9 and 10 inclusive. Loosely mounted on the shaft 66 are a plurality of rings 79, one for each totalizer unit. Connecting the side-bars 67 of each totalizer are a plurality of spacers or pivots 80, each having mounted thereon a disk 81, which is free to rotate on the spacer 80, but is held from longitudinal movement thereon. Carried by the disk 80 are two pins 82 and 83, the pins of each disk extending through arcuate slots 84 and 85, respectively, in the plate 67. A tension spring 86 connects the spacer 80 with the ring 79, and tends to draw the spacer 80 together with the plates 67 and the totalizer unit carried thereby rearwardly or to the right, as viewed in Figs. 8, 9 and 10. The amount of rearward motion that can be produced by the springs 86 is limited by the elongated openings 87 in the plates 67, and is just sufficient to rotate the totalizer mechanism one unit when the gear 57 is in contact with the rack-bar 22. The direction of rotation will depend upon which bifurcation of the rack-bar is in contact with the gear 57, and will be such as to subtract one from the totalizer unit thus rotated, if the mechanism is set in subtracting position, and to add one, if it is set in adding position. The plates 67 are normally held forwardly against the action of the springs 86 in the position shown in Figs. 8, 9 and 10, by means of the latch 88. This latch 88 has a shoulder 89, which engages a rectangular projection 90 on the spacer 68 which connects the rear ends of the plates 67. A spring 91 is fastened at one end to an arm 92 on the latch-bar 88, and has its other end secured to a plate 93, which extends across the machine, and is fastened to the frame thereof. The bar 88 has a tail member 94, which extends forwardly and rests against the under side of the ends of the lugs 82 and 83 that project through the plate 67. The tail piece 94 has extended surfaces 95 and 96 to bear against the lugs 82 and 83, so that, regardless of the position of the disk 81 longitudinally of the machine the lugs 82 and 83 will be in contact at some point along these bearing surfaces. The disk 81 carries a single tooth 97 in position to contact with the tooth 98 of the one-tooth gear 60 carried by the totalizer unit. It will thus be seen that for each revolution of the totalizer unit, the one-tooth gear 98 will contact with the tooth 97 and partially rotate the disk 81 and cause one or the other of the projections 82 and 83 to press downwardly on the tail piece 94 of the latch 88, and move the latch in opposition to the spring 91 out of contact with the rectangular projection 90, thus freeing the plates 67 and the mechanism carried thereby to move rearwardly under the tension of the spring 86. This movement rolls the pinion 57 on the rack-bar 22 a sufficient distance to move the numeral wheel one point. Thus, for each revolution of a totalizer unit in one decimal position, the totalizer unit in the next higher decimal position is caused to rotate one point, thus carrying one from the lower decimal position to the higher decimal position. If the machine is being operated to add, the totalizer unit in the higher decimal position will be rotated one point in the direction to add, and if the machine is being operated to subtract, the totalizer unit in the higher decimal position will be rotated in the subtracting direction, since the gear 57 is in contact with the lower bifurcation of the rack in one case, and with the upper bifurcation in the other case. It should be noted that the teeth 97 and 98 are so proportioned that if the tooth 98 is in position to carry, as shown in Figs. 8 and 9, when the racks are released, there is sufficient play between the teeth to allow the parts, moved by the racks, to start their motion and so gain some momentum before the tooth 98 contacts with the tooth 97. This is to insure the operation of the tripping disk 81 and to prevent the catch 88 from holding the parts, as might occur if the catch had to be freed before any motion at all took place. To further insure easy operation of the catch 88, the catch is pivoted at 66 so that as it is swung upwardly in releasing operation, the angle of the shoulder 89 with the squared lug 90 is varied by the swinging of the latch about its pivot, making the releasing operation an easy one. Rigidly mounted on the shaft 66 are a plurality of cam members 99 adapted to coöperate with lugs 100 carried by the plates 67. At the close of each calculating operation, the shaft 66 will be given a complete revolution by gear 43 and pinion 66', Fig. 4, and the cams 99 will contact with the lugs 100 to force the plates 67, together with the mechanism carried by them, back to their original position, where they will be caught and held by the latches 88. Before the rotation of the shaft 66, the bar 63 will be shifted, as will be explained, into its central or non-calculating position, and the gears 57 will be out of contact with the racks during this return motion.

Setting mechanism.

Mechanism is provided for setting the machine in adding, subtracting or non-calculating position, as the operator may desire. This mechanism will be best understood from an examination of Figs. 2, 3, 5, 6, 7 and 22. Extending longitudinally of the machine, as shown in Fig. 2, is a rock-shaft 101, which has rigidly attached thereto an operating lever 102, and a gear segment 103. Extending around the shaft 33, as best shown in Fig. 3, are a number of rack-teeth 104 contacting with the teeth on the gear segment 103. The shaft 103 is free to rotate and also to slide longitudinally in the frame of the machine. The pinion 48 carried by the gear 33 is made broad enough so that the longitudinal movement of the shaft 33 will not disengage it from the gear 44. Carried by the shaft 33 are two cams 105 and 106, each having three cam members, as illustrated in Figs. 3, 5 and 6. The smaller cam member 107 has a rachet tooth 108 projecting outwardly therefrom, which has a short cam surface 109 concentric with the shaft 33, and having the same radius as the plain disk 110. The largest cam 111 has a notch 112 with a short surface 113, of the same radius as the disk 110. By moving the lever 102, any one of the cams 107, 109 or 111 may be brought into position to contact with the teeth 112 carried by the reciprocating plates 113. The plates 113 are mounted to slide vertically on the bars 114 rigidly supported by the frame of the machine. These plates are held in position by a bracket 115 and are resiliently pressed downwardly by springs 116. Extending forwardly from the plates 113 as shown in Figs. 4, 5 and 7, are arms 117. These arms are rigidly connected with the bar 63 to shift said bar vertically. This shifting movement of the bar 63 carries with it the member 62, and the totalizer units carried thereby, the extreme upper position of the bar 63 holding the totalizer mechanism in contact with the bifurcation 27 of the rack 22, while the extreme downward position brings it into contact with the bifurcation 28 of said bar, and the central position or non-calculating position holds the totalizer mechanism out of contact with the rack. It will thus be seen that when the tooth 112 is in contact with the disk 110, the totalizer units will be in neutral or non-calculating position. If the shaft 63 is shifted longitudinally to the right in Fig. 3, the tooth 112 will ride laterally onto the surface 109 of the tooth 108. If the shaft 33 is now rotated in a clockwise direction, as shown in Fig. 5, the first result of such rotation will be to move the tooth 108 out of contact with the tooth 112, and allow the plate 113 to be drawn downwardly under the tension of the spring 116, thus shifting the totalizer mechanism into contact with the lower bifurcation of the rack-bar 22. The mechanism will remain in this position until the shaft 33 has almost made a complete revolution. At the end of the complete revolution of the shaft 33, the tooth 112 will again ride upwardly onto the tooth 108 and the totalizer mechanism will be restored to its non-calculating position. If the lever 102 is rocked into the opposite or adding position, the cam 111 will be brought into position beneath the tooth 112. If the shaft 33 is now rotated in the same direction as before, the first result of said rotation will be to lift the plate 113 upwardly, thus raising the totalizer mechanism into contact with the upper bifurcation of the rack 22. The totalizer mechanism will remain in this position until the shaft 33 has reached the end of a complete revolution, at which time the tooth 112 will again be permitted to drop into the notch 113, thus restoring the totalizer to its neutral or non-calculating position. As previously explained, the shaft 33 is given a complete revolution during each forward movement of the hand-crank 35, and it will now be apparent that at the beginning of the revolution of the shaft 33 the totalizer mechanism will be shifted either into the adding or subtracting position, according to the position of the lever 102, and will remain in this position until the completion of the revolution of the shaft 33, at which time it will be restored to its neutral or non-calculating position. This setting of the totalizer mechanism to add or subtract occurs just previous to the action of the cam 54, by which the lever 53 is rocked to release the racks 22. It will thus be seen that when the racks are released by the lever 53, the totalizer mechanism will be in position to contact with the racks to transfer to the totalizer mechanism whatever number is set up on the key-board. A latch member 118 is mounted for sliding movement on the cross-bar 13, and is resiliently held downwardly by springs 119. A tooth 120 is carried by the latch 118, and is adapted to enter notches in the projection 121 carried by the shaft 101, as shown in Fig. 22. The projection 121 is provided with three notches to correspond with the three positions of the lever 102 and cooperate with the tooth 120 to prevent the lever 102 from being accidentally displaced from any position in which it has been set.

*Rack return.*

After the operating racks have moved forwardly to transfer to the totalizer the number which has been set up on the key-board, and to set the printing mechanism, and after the printing hammers have been released to print the number set up on the key-board, it is necessary to restore the racks to their original position to be ready for the next calculating operation. This restoration of the racks is accomplished during the final part of the return stroke of the hand-crank 35. As was previously pointed out, the shaft 34 is rotated by the gear 43 during the return stroke of the hand-crank 35. As shown in Fig. 1 the shaft 34 carries a mutilated gear 122. During the last part of the rotation of the shaft 34 the teeth on this mutilated gear are brought into contact with the rack 123 carried by the frame 124, which is mounted to slide longitudinally of the machine, and is supported on the shafts 33 and 34 by means of slots 125. As shown in Fig. 2, the frame 124 carries at its forward end a cross-bar 126. This cross-bar is in position to contact with the upstanding portion of the rack-bars 22, so that when the frame 124 is moved backwardly by the mutilated gear 122, the bar 126 contacts with the upstanding portion of any of the bars 22 that may have moved forwardly and returns all of the bars 22 to their original position against the tension of the springs 24. When the bars are brought to their rear position, the latch bar 25 carried by the levers 53 enters the notch 26 in the bars 22, and thus locks them in their retracted position. During the last part of the final rotation of the gear 43, one of the projections 154 carried by this gear contacts with the projection 153 of shaft 152, see Fig. 2, and partially rotates this shaft, bringing the pin 157 carried thereby into contact with lug 158 carried by the key lock release bar 145, to move the lock release bar and release the keys that were depressed, thus restoring them to their upper position to be ready for the next operation. Coacting with shaft 152 is an error key 155, and a repeat key 156, but as these keys are not a part of the present invention, detailed description of them is deemed unnecessary.

*Automatic clearing mechanism.*

After a calculation is completed, it is necessary to restore the totalizer wheels to their zero position. In this machine this is accomplished by shifting the automatic clearing lever shown at 127 in Figs. 2 and 20, and then moving the hand-crank as in a calculating operation. In this machine the clearing operation is accomplished with the totalizer mechanism set in the subtracting position, and means is provided to shift the totalizer mechanism into this position by the movement of the automatic clearing lever, in case it is not already in that position. The automatic clearing lever is rigidly attached to the shaft 128, as shown in Figs. 2 and 20. Rigidly attached to the shaft 128 is an arm 129, and a spring 130, which normally holds the shaft 128 in the position shown in Fig. 20. The shaft is held from further rotation by the spring 130 by means of the arm 131 rigidly carried by the shaft 128. This arm 131 fits into an opening in the slide-bar 132, shown in Fig. 20, and the slide-bar is prevented from movement to the right as shown in that figure by means of the slots 133 and screws 134. Mounted on the shaft 128 is a cam member 135 shown in Figs. 2 and 21. This cam member is located in position to contact with a pin 136, carried by the shaft 101. It will be seen that when the shaft 128 is rocked by the lever 127, the cam member 135 will move the pin 136 upwardly, thus rotating the shaft 101 in the direction to shift the shaft 33 into the subtracting position, if it is not already in such position. Also carried by the shaft 128 are a plurality of catch members 137. One catch member 137 is provided for each totalizer unit. By reference to Fig. 8, it will be seen that dogs 138 are pivotally carried on the shaft 66, and each dog has a projection 139 adapted to coöperate with the latch member 137 to hold said dog in retracted position. Springs 140, shown in Fig. 10 tend to move the dogs 138 upwardly against the action of the catch 137. Near the end of the dog 138 is a tooth or projection 141 (see Fig. 17). This projection 141 is in position to contact with the periphery of the automatic clearing wheel 58 of each totalizer unit. The end of the dog 138 is bent laterally to form a catch member 142. This catch member 142 is in position to contact with a series of ratchet teeth 143 carried on the under surface of the lower bifurcation 28 of the rack-bar, which rotates the totalizer mechanism with which the projection 141 coöperates. A notch 144 is cut in the automatic clearing wheel 58, in such position that it will be opposite the projection 141 when the zero on the numeral wheel is in the sight position. (See Fig. 8). The parts are so proportioned that when the totalizer is in neutral position, and the dog 138 released, the catch 142 will contact with the teeth 143 to prevent the racks 22 from moving forwardly, whether the numeral wheel is in zero position or not. If the totalizer is in subtracting position, however, and the numeral wheel is not in the zero position, the projection 141 contacts with the periphery of the wheel 58 and prevents the catch 142 from contacting with the teeth 143. When the automatic clearing lever 127 is rocked forwardly, as shown in Figs. 2 and 20, the arm 131 forces the slide 132 forwardly into contact with the cam surface 144 on the lock releasing bar 145, shown in Figs. 2 and 4. The lock releasing bar 145 is notched on its lower surface, and these notches engage the key-locks 19 (see Figs. 1 and 4). It is thus seen that when the machine is set for automatic clearing the bar 145 will unlock any key that may be pressed down, so that during the clearing operation the racks are free to move forwardly unrestrained by any of the keys of the key-board. It will now be apparent that after the automatic clearing key is set the dogs 138 are released to move upwardly under the influence of the springs 140, the totalizers are set for subtraction, and the keys 15 are all in their upper position. The operator now moves the hand lever 35 forwardly, the effect of which movement, as previously pointed out, is to shift the totalizer into contact with the racks, and then to release all of the racks. If any totalizer unit is in zero position when the racks are released, the projections 141 will coincide with the opening 144 of that particular unit, and the catch 142 will be in contact with one of the teeth 143 of the rack corresponding to that unit. The rack of that unit will therefore be held from movement, and the numeral wheel of that unit will not be rotated, but will remain in zero position. If, however, a totalizer unit is not in zero position, the catch 142 will be held out of contact with the teeth 143 because the projection 141 will rest against the periphery of the automatic clearing wheel 58. As the rack moves forwardly, the wheel 58 will rotate until the numeral wheel connected therewith reaches its zero position. As soon as this happens, the projection 141 will enter the notch 144 in the automatic clearing wheel, and the notch 142 will move upwardly into contact with one of the teeth 143, thus arresting the forward movement of the rack, and no further rotation of the unit will take place. It should be clearly understood that the motion is checked by the catch 142 and the rack-teeth 143, and not by the projection 141 and the automatic clearing wheel. The notch 144 in the automatic clearing wheel is made larger than the projection 141 in order that the motion may be checked by the catch 142 and teeth 143, and not by the clearing wheel and projection 141. The notch 144 merely determines the position of the clearing wheel at the time that the forward movement of the rack is arrested by the catch 142. As previously explained, the last result produced by the forward movement of the hand-crank 35 is to return the totalizer to its neutral position, shifting the pinions 57 out of contact with their respective racks. This occurs during the clearing operation the same as it does during the calculating operations. After the hand crank 35 has been moved to its extreme forward position, and the totalizer units shifted to their neutral position, the hand-crank is allowed to return under the influence of the spring 37 to its original position. This return movement, as previously explained, rotates the shaft 34 a complete revolution, and returns all of the racks to their retracted position against the influence of the springs 24. To hold the automatic clearing lever in its forward position during the clearing operation, a catch lever 146 is provided, as shown in Figs. 2 and 21. This catch lever is pivoted to the main frame at 147, and carries a tooth 148 adapted to contact with a corresponding tooth 149 carried by the shaft 128. The lever 146 is resiliently held downwardly by a spring 150, so that when the lever 127 and shaft 128 are rocked forwardly, the catches 148 and 149 are brought into contact to hold the shaft in this position. During the return movement of the hand-crank 35, which rotates the shaft 34, as previously explained, a cam 151 carried by the shaft 34, as shown in Figs. 2 and 21, contacts with the under surface of the lever 146, forcing it upwardly against the tension of the spring 150, and thus releases the shaft 128, which is thereupon rotated by the spring 130 to cause the catch members 137 to contact with the members 139 and withdraw the dogs 138 from their operative position into the position shown in Fig. 8. At the same time the arm 131 is returned to its original position, withdrawing the slide 132, and allowing the key-lock-bars 19 to return to their original position. It will thus be seen that the return movement of the hand-crank 35 restores all of the parts of the machine to position for a new calculating operation, and the totalizer units are all left in zero position.

*Printing mechanism.*

The printing mechanism is designated generally by the reference numeral 159, Fig. 1, and may be of any well known and approved type, but preferably that shown in my co-pending application before referred to. The ribbon feed is shown at 160, the platen at 161, and the spring actuated printing hammers at 162. Mechanism for operating the spring hammers is shown in Fig. 25. Each of the hammers 162 has a downwardly projecting tail 163 in which there is a notch 164. A series of dogs pivoted on a transverse shaft 166 is arranged to coöperate with the downwardly projecting ends 163 of the hammers to hold them in retracted position. The lower end of each dog coöperates with a shoulder 167 on one of the racks 22. When the rack 22 is allowed to move forwardly, as previously explained, the dog 165 is rotated on the shaft 166 sufficiently to disengage it from the notch 164, leaving the printing hammer free to move forwardly under the influence of its spring, except for the restraining action of the cam 168 carried on shaft 34, as shown in Figs. 2 and 25. As previously explained, the shaft 34 is rotated during the return movement of the operating handle 35, and, as will be seen in Fig. 25, the first result of such rotation will be to free the hammers 162 from the restraining action of the cam 168. Each printing hammer that has been previously released from the dog 165 will therefore move forwardly at the beginning of the return stroke of the operating handle 35 to print the number set up in the printing mechanism. If any rack 22 has not been moved, the corresponding dog 165 will hold the hammer 162, and no printing will take place in the decimal order corresponding therewith. If, however, a rack of one of the higher decimal orders has been operated, the dog 165 corresponding therewith will release the dogs of all the lower orders, since each dog carries a lug 169, which overlaps the dog of the next higher order, as shown in Figs. 2 and 25. If no number has been set up in the decimal orders in which the dogs are thus released, the printing hammers will print zero in these orders. After the hammers have completed the printing operation, further rotation of the shaft 64 and cam 168 will bring the cam into contact with the tails 163 of the hammers and restore them to the position shown in Fig. 25. The mechanism for setting up in the printing device the numbers to be printed may be of any well known and approved type and is operated by the extensions 31 on the racks 22. As this specific mechanism is not a part of the present invention, further description thereof is thought to be unnecessary. As shown in Figs. 20 and 21, mechanism is provided for shifting the ribbon into a different position during the subtracting operation from that which it occupies during the adding operation. Connected to shaft 101, which operates the setting mechanism, as previously described, is an arm 170. When the shaft 101 is rocked to set the totalizer for subtraction the arm 170, through the link 171 and lever 172, shifts the ribbon guide 173 upwardly, and brings the lower position thereof into position to be struck by the printing hammers. Since the lower portion of the ribbon is of a different color from the upper portion, figures that are to be subtracted will be printed in a different color from figures that are to be added.

I claim:

1. In a calculating machine, computing mechanism having parts to be driven in sequence, an operating handle arranged to be reciprocated through an arc of a circle, two drive shafts for operating the parts of said computing mechanism in sequence, means for rotating one of said drive shafts a complete revolution during the movement of said handle in one direction, and means for rotating the other of said drive shafts a complete revolution during the movement of said handle in the other direction, each drive shaft being held stationary during the rotation of the other.

2. In a calculating machine, computing mechanism having parts to be driven in sequence, a main drive shaft, an operating handle mounted on said main drive shaft, two supplementary drive shafts for operating the parts of said computing mechanism in sequence, means mounted on said main drive shaft for rotating one of said supplementary shafts during the movement of said handle in one direction, and means operable independently of said aforementioned means and mounted on said drive shaft for rotating the other supplementary shaft during the movement of said operating handle in the other direction, said drive shafts each remaining stationary during the rotation of the other.

3. In a calculating machine, computing mechanism having parts to be driven in sequence, a main drive shaft and two supplementary drive shafts for operating said mechanism, means connecting said main drive shaft and said supplementary drive shafts to produce a complete revolution of said supplementary drive shafts at different periods in the operation of said calculating machine, each of said supplementary shafts remaining stationary during rotation of the other, means mounted on one of said drive shafts for controlling the calculating operation of said calculating machine, and means mounted on the other of said drive shafts for restoring operating parts of said calculating machine after the calculating operation.

4. In a calculating machine, a main drive shaft, an operating handle mounted on said main drive shaft adapted to be reciprocated through an arc of a circle, a supplementary drive shaft, means mounted on said supplementary drive shaft for controlling the calculating operations of said calculating machine, means for producing a complete rotation of said supplementary drive shaft during the first movement of said operating handle, a second supplementary drive shaft, means mounted on said second supplementary drive shaft for restoring operating parts of said calculating machine after a calculating operation, and means for producing a complete rotation of said second supplementary drive shaft during the return movement of said operating handle, said supplementary drive shafts each being held stationary during the rotation of the other.

5. In a calculating machine, a drive shaft adapted for longitudinal movement, a plurality of cam members mounted on said drive shaft, a totalizer shaft, means operated by said cam members for moving said totalizer shaft in one direction upon rotation of said drive shaft when said drive shaft is in one longitudinal position, and means for moving said totalizer shaft in another direction upon rotation of said drive shaft when said drive shaft is in another longitudinal position.

6. In a calculating machine, a drive shaft, means for shifting said drive shaft longitudinally and means controlled by the longitudinal movement of said shaft for setting said calculating machine in adding, subtracting or non-calculating position.

7. In a calculating machine, a plurality of totalizer units, a shaft for each totalizer unit, resilient means for moving said totalizer units in unison in one direction, a drive shaft, means connected with said drive shaft for moving said totalizer units in the opposite direction, means for shifting said drive shaft longitudinally and means controlled by the longitudinal movement of said drive shaft to control the direction of movement of said totalizer units upon the operation of said calculating machine.

8. In a calculating machine, a totalizer, pinions for operating said totalizer, racks for moving said pinions, a drive shaft, means for moving said drive shaft longitudinally, and means connecting said drive shaft and said totalizer for moving said totalizer into and out of contact with said racks controlled by the longitudinal movement of said drive shaft.

9. In a calculating machine, a totalizer shaft, means for shifting said totalizer shaft in one direction to set said calculating machine for adding operations, means for shifting said totalizer in another direction to set said calculating machine for subtracting operations, a drive shaft, means for moving said drive shaft longitudinally and means controlled by the longitudinal movement of said drive shaft to control the movement of said totalizer.

10. A totalizer for calculating machines comprising a totalizer unit, side plates, a shaft journaled in said side plates, and carrying said totalizer unit, a shaft on which said side plates are pivotally and slidably mounted, and means for moving said side plates upon said shaft for controlling the operation of said totalizer unit.

11. In a calculating machine, a totalizer shaft, pivoted side members in which said totalizer shaft is journaled, reciprocating side members, slots in said reciprocating side members in which said totalizer shaft is mounted for rotation and reciprocation, and means for moving said reciprocating side members to control the direction of rotation of said totalizer shaft.

12. In a calculating machine, a totalizer unit, pivoted side members in which said totalizer unit is mounted for rotation, a lock for said totalizer unit pivotally mounted on one of said pivoted side members, a reciprocating member for moving said pivoted side members upon their pivots, and a lock controlling means pivotally mounted on one of said pivoted side members, and having sliding contact with said reciprocating member.

13. In a calculating machine, a totalizer unit, means for shifting the axis of rotation of said totalizer unit in one direction for controlling the direction of rotation of said totalizer unit, and means for shifting the axis of rotation of said totalizer unit in another direction in a plane at an angle to the plane of said first-mentioned movement for producing a carrying operation on said calculating machine.

14. In a calculating machine, a totalizer unit, a one-tooth gear carried by said totalizer unit, a one-tooth disk adapted to coöperate with said one-tooth gear, a second totalizer unit, and a latch for controlling the movement of said second totalizer unit adapted to be operated by said one-tooth gear.

15. In a calculating machine, an operating rack, a totalizer unit operated by said rack, and means separate from said totalizer unit but controlled thereby for arresting the movement of said rack when the totalizer unit operated thereby is in a predetermined position, said means being arranged to withstand the force incident to said arrest independently of said totalizer unit.

16. In a calculating machine, a plurality of totalizer units, a separately movable device for operating each of said totalizer units, and means controlled by each of said totalizer units but separate therefrom for arresting the movement of the operating device for said unit and for withstanding the force of said arrest independently of said totalizer unit.

17. In a calculating machine, a totalizer unit, a reciprocating member for driving said unit to perform a computing operation, a device separate from said totalizer unit for arresting the movement of said reciprocating member when said totalizer unit is in a predetermined position to effect a clearing operation, and means for breaking the operative connection between said reciprocating means and said totalizer after the movement of said reciprocating means has been stopped to permit the restoration of said reciprocating means to its original position without moving said totalizer unit.

18. In an automatic clearing device for a calculating machine having an operating rack, a catch for arresting the movement of said rack, and means for moving said catch into contact with said rack for preventing operation thereof, a totalizer unit operated by said rack, and means on said totalizer for controlling the operation of said rack-arresting means.

19. In a calculating machine, a plurality of totalizer units, a rack for operating each of said totalizer units, ratchet teeth on each of said racks, pivotally mounted dogs adapted to coöperate with said ratchet teeth to arrest the movement of said racks, and means on said totalizer units for causing the operation of said dogs when said totalizer units are in zero position.

20. In a calculating machine, a totalizer, an automatic clearing disk carried by said totalizer, operating means for said totalizer, and means for arresting the movement of said operating means controlled by said automatic clearing disk but disconnected therefrom.

21. In a calculating machine, a totalizer, an automatic clearing disk connected to said totalizer to rotate therewith, operating means for said totalizer, means controlled by said automatic clearing disk for arresting the movement of said operating means, and means for holding said arresting means out of operative position.

22. In a calculating machine, a totalizer, operating means for said totalizer, a lock for said operating means, means for shifting the axis of rotation of said totalizer, and means for preventing the operation of said lock when the axis of rotation of said totalizer is in one position, but permitting said lock to operate when the axis of rotation of the totalizer is in said position and said totalizer is in a predetermined angular position.

23. In a calculating machine, a totalizer, an operating means for said totalizer, a lock for controlling the movement of said operating means, means for preventing the operation of said lock when said totalizer is set for subtraction and is not in zero position, but permitting the operation of said lock when said totalizer is in zero position, and when said totalizer is in or out of zero position, and is set for adding or in neutral position.

24. In a calculating machine, the combination with automatic clearing mechanism, of a shaft for controlling the operation of said automatic clearing mechanism, a lever attached to said shaft for rotating said shaft into position for permitting the operation of said automatic clearing mechanism, a catch on said shaft, a lock lever adapted to coöperate with said catch and hold said lever in said position, a drive shaft and a cam on said drive shaft for releasing said lock lever after the operation of said automatic clearing mechanism.

25. In a calculating machine, a totalizer unit, resilient means for shifting the axis of rotation of said unit, mechanism for actuating said unit one space during said shifting movement, a catch for holding said unit against shifting movement, a second totalizer unit, and means actuated by said second unit for releasing said catch when said second unit passes through a carrying position, said releasing means being arranged to be moved slightly by said second unit prior to said releasing operation when said second unit is in position to move through carrying position at the beginning of a rotation thereof.

26. In a calculating machine, a totalizer unit, rack and pinion mechanism for operating said unit, resilient means for shifting the axis of rotation of said unit to cause said unit to be moved one space by said rack and pinion mechanism for performing a carrying operation, a catch for holding said resilient means against operation, a device for releasing said catch, a second totalizer unit, and a one-toothed gear operable by said second totalizer unit for controlling said catch releasing device, said gear being arranged to permit a slight movement of said second totalizer unit prior to the actuation of said catch releasing device regardless of the position of said second totalizer unit at the beginning of a computing operation.

27. In a calculating machine, a plurality of totalizer units, means for operating said units in opposite directions for performing adding and subtracting operations, means for shifting the position of the axes of rotation of said units for performing carrying operations, and means operable by one of said units when operating in either of said opposite directions for controlling the shifting means of another of said units.

28. In a calculating machine, a totalizer unit, means for shifting the axis of said unit to cause the rotation of said unit through one place, mechanism for controlling the shifting of said axis, a second totalizer unit, and means operable by said second totalizer unit when moved in either of two opposite directions for operating said mechanism for controlling said axis shifting means.

29. In a calculating machine, computing mechanism, a main drive shaft, and two supplementary drive shafts for operating said mechanism, and means carried by said main drive shaft for operating said supplementary drive shafts independently and successively, said operating means being inoperative to drive one of said shafts until the operation of the other of said shafts is completed.

30. In a calculating machine, computing mechanism, a main drive shaft, and a pair of supplementary drive shafts for operating said mechanism, and mechanism carried by said main drive shaft for rotating said supplementary drive shafts successively, said last named mechanism being inoperative to rotate one of said shafts until the movement for rotating the other of said shafts has been completed.

31. In a calculating machine, computing mechanism, a main drive shaft, and a pair of supplementary drive shafts for operating said mechanism, and mechanism comprising a handle carried by said main drive shaft for rotating said supplementary drive shafts independently and successively, the rotation of said supplementary shafts occurring during one stroke of said handle and the rotation of the other of said supplementary shafts occurring during the second stroke of said handle, said last-named mechanism being inoperative during the second stroke of said handle if the first stroke of said handle has not been previously completed.

In testimony whereof I have signed my name to this specification, in the presence of two subscribing witnesses, on this 5th day of January, A. D. 1915.

OTTO MALCHER.

Witnesses:
A. J. CRANE,
THOMAS COLSON.